(12) United States Patent
Adigrat et al.

(10) Patent No.: US 7,908,888 B2
(45) Date of Patent: Mar. 22, 2011

(54) PROCESS FOR PRODUCING A LOW-ATTENUATION OPTICAL FIBER

(75) Inventors: Antonio Adigrat, Battipaglia (IT);
Stefano Grieco, Giffoni Vallepiana (IT);
Valeria Caronna, Salerno (IT);
Giuseppe Ferri, Ivrea (IT); Franco Cocchini, Salerno (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 704 days.

(21) Appl. No.: 10/584,092

(22) PCT Filed: Dec. 24, 2003

(86) PCT No.: PCT/EP03/51102
§ 371 (c)(1),
(2), (4) Date: Mar. 30, 2007

(87) PCT Pub. No.: WO2005/063638
PCT Pub. Date: Jul. 14, 2005

(65) Prior Publication Data
US 2008/0034800 A1 Feb. 14, 2008

(51) Int. Cl.
*C03B 37/018* (2006.01)

(52) U.S. Cl. .......................................... 65/422

(58) Field of Classification Search .................. 65/435, 65/422, 426, 439, 900
See application file for complete search history.

(56) References Cited

U.S. PATENT DOCUMENTS

| 3,932,162 A | 1/1976 | Blankenship |
| 4,684,383 A * | 8/1987 | Cavender et al. ............... 65/426 |
| 4,810,276 A | 3/1989 | Gilliland |
| 2003/0024278 A1 * | 2/2003 | Berkey et al. ................... 65/428 |

FOREIGN PATENT DOCUMENTS

| WO | WO 00/64825 | 11/2000 |
| WO | WO 0064824 A2 * | 11/2000 |
| WO | WO 01/49616 A1 | 7/2001 |
| WO | WO 03/011779 A1 | 2/2003 |
| WO | WO 03/045861 A1 | 6/2003 |

* cited by examiner

*Primary Examiner* — Matthew J Daniels
*Assistant Examiner* — Erin Snelting
(74) *Attorney, Agent, or Firm* — Finnegan, Henderson, Farabow, Garrett & Dunner, L.L.P.

(57) ABSTRACT

A process for producing a low-attenuation optical fiber by producing a soot core preform by chemical deposition on a substrate; removing the substrate from the soot core preform, thereby forming a central hole along the soot preform; drying and consolidating the soot core preform in a consolidation furnace to form a glass core preform; heating the glass preform in the consolidation furnace above a glass melting temperature to produce a reduction of the diameter of the central hole; and stretching the glass core preform to completely close the central hole.

14 Claims, 6 Drawing Sheets

PROCESS FOR PRODUCING A LOW-ATTENUATION OPTICAL FIBER

CROSS REFERENCE TO RELATED APPLICATIONS

This application is a national phase application based on PCT/EP 2003/051101, filed Dec. 24, 2003, the content is incorporated herein by reference.

BACKGROUND OF THE INVENTION

1. Field of the Invention

The present invention relates to a process for producing a low-attenuation optical fiber.

2. Description of the Related Art

One of the most important characteristics of a telecommunication optical fiber is the signal attenuation in particular wavelength regions currently used for long-distance transmission. In fact, the lower is the signal attenuation, the longer the distance the signal can travel before being amplified.

It is well known that fiber attenuation is negatively affected by the presence of impurities, which can be incorporated within the fiber during the process of manufacturing thereof. Particularly troublesome is the attenuation caused by contamination by hydroxyl radicals (OH) or water. The attenuation increase due to the presence of OH or water in the glass can be as high as about 0.5 to 1.0 dB/km, with a peak in the wavelength range from 1330 nm to 1470 nm (commonly identified as "1380 nm window"), making this range unsuitable for long-distance transmission. The most suitable wavelength range for long-distance transmission is still that around 1550 nm, which guarantees very low losses.

The advent of wavelength division multiplexing (WDM) technology, which enables telecommunication systems to operate over broad wavelength ranges, makes it likely to exploit the 1380 nm window. Removing, or at least reducing, the water peak from optical fibers is very important to obtain low-loss optical telecommunication systems operating on a wide wavelength band (such as from about 1300 nm to about 1700 nm).

WO 00/64825, in the attempt to solve the above problem, proposes a method of fabricating a cylindrical glass body for use in manufacturing optical waveguide fiber, wherein the incorporation of water is at least reduced.

WO 00/64825 describes the following process to produce an optical fiber. A porous body is made by depositing reaction products on a cylindrical substrate in a conventional Outside Vapor Deposition (OVD) process. A centreline hole (or "central hole") extending axially through the porous body is formed by removing the substrate. The hollow body so obtained is consolidated in a chlorine-containing atmosphere to chemically dry the blank, thus forming a consolidated glass preform having a centerline hole extending axially therethrough. The core glass preform is then typically positioned within a redraw furnace and heated to a temperature sufficient to facilitate redrawing or stretching of the core preform into a smaller diameter cylindrical glass body or core cane. During the redraw operation, the centerline hole of the core blank is closed by, for example, applying vacuum along the centerline hole. The reduction in pressure within the centerline hole ensures complete closure of the centerline hole such that the core cane has a solid centerline region extending axially therethrough. After the redraw step, the resulting core cane is typically overclad with a layer of cladding soot, e.g. deposited via an OVD process. The resulting soot overclad core cane is chemically dried and consolidated to form an optical fiber preform, which can thereafter be drawn into an optical waveguide fiber.

Despite the chemical drying and consolidation steps, such optical fibers have been found to exhibit a relatively high level of attenuation measured at approximately 1380 nm. The water peak is largely a result of water being trapped in the glass during the fiber manufacture process, a large portion of this water being trapped within the centerline region of the core cane prior to or during closure of the centerline hole. In fact, although the blanks are chemically dried and sintered during consolidation, it has been found that the region of glass surrounding and defining the centerline hole is being rewet after drying, mainly due to exposure to ambient atmosphere, which unavoidably contains water. This rewetting can occur for example when the preform is removed from the consolidation furnace and moved to the redraw furnace for further processing steps. Moreover, the greater the exposure time, the greater the amount of water absorbed by the glass.

To reduce the amount of water trapped within the centerline region of the core cane, WO 00/64825 proposes either to prevent water exposure of the centerline hole of the dried and consolidated preform by closing the centerline hole during consolidation, or to chemically remove the water after rewetting has occurred, preferably at redraw, by treating the centreline hole with a chemical drying agent, a chemical etching agent or deuterium.

In order to prevent rewetting of the glass bounding the centerline hole, it is proposed either to close the centerline hole or to seal the centerline hole during consolidation.

As concerns the solution of closing the centerline hole, the following method is described. Prior to consolidation of the soot preform, a glass plug is fitted to the end of the centerline hole opposite the end of the soot preform provided with a handle. Following chlorine drying, the porous body (held vertically via the handle) is down driven into the hot zone of the consolidation furnace, preferably in an inert gas atmosphere, such as helium. The elevated temperature generated in the hot zone, preferably about 1500° C., sinters porous body as it enters the hot zone. The inwardly directed sintering forces reduce the diameter of porous body thereby closing porous body onto plug to effectively seal one end of centerline hole. The porous body is further down driven to sinter the remainder of porous body thereby forming a sintered glass preform having a centerline hole sealed at its plugged ends.

Following the consolidation step, the sintered glass preform is preferably withdrawn from the hot zone, and the centerline hole is exposed to a vacuum of at least 10 Torr, more preferably 100 mTorr, through an inner handle, which communicates with centerline hole through the handle. The sintered glass preform is again down driven into the hot zone of consolidation furnace while centerline hole is under vacuum. As the sintered glass preform enters the hot zone, it softens sufficiently so that the vacuum force acting on the glass bounding the centerline hole draws the glass inward, thereby closing centerline hole as the sintered glass preform continues to move through the hot zone.

The resulting solid sintered glass preform can then be removed from consolidation furnace and stored for further processing at a later time, or moved to a redraw furnace where it can be drawn into a reduced diameter cane. In either event, since centerline hole is closed (i.e., the sintered glass preform has a solid centerline region), the centerline region will not be exposed to ambient atmosphere and thus will not be rewet upon removal from consolidation furnace.

SUMMARY OF THE INVENTION

The Applicant has observed that the process conditions required to produce the complete closure of the central hole at the end of the consolidation process are such that generation of internal defects in the preform, like bubbles or voids, is very likely.

The Applicant has then found that, by causing only a partial closure of the central hole in the consolidation furnace, and then completing the closure of the central hole in the subsequent step of stretching, the problem of rewetting of the central hole after consolidation is largely reduced and the formation of bubbles and voids is very unlikely. The partial closure of the central hole is achieved by subjecting the core preform to a further thermal treatment after the steps of drying and consolidation in the furnace, without extraction of the preform from the furnace between the consolidation and the further thermal treatment.

In fact, the collapse of the central hole during stretching, that is with the help of the inward stresses due to the overall diameter contraction, is much more effective to avoid formation of bubbles or voids in the fiber. At the same time, even without the complete closure or sealing of the central hole before extraction of the preform from the consolidation furnace, the reduction of the hole diameter renders the OH contamination after extraction from the furnace very low, and fibers with final peak attenuation lower than 0.35 dB/km can be thus obtained.

Even with respect to the conventional process wherein the central hole closure is completely done during stretching, the Applicant has observed that there is a sensible reduction of the internal defects. This is presumably due to the fact, in the process of the present invention, stretching is performed on a preform having a central hole of reduced diameter and the stress undergone by the glass body is therefore lower.

It has to be remarked that reducing the occurrence of internal defects in the optical fibres is a relevant item for industrial production, since it allows reducing waste and operations and obtaining higher fiber lengths.

According to the present invention, upon consolidation of the core preform in the hot zone of a furnace, the preform is extracted from the hot zone but not from the furnace, to avoid exposure to water-containing atmosphere. The central hole is then exposed to a vacuum through the handle on top of the consolidated preform. After raising the temperature of the hot zone to a glass melting temperature, the glass preform is again down driven into the hot zone at a predetermined speed. In such conditions the glass softens enough to get a significant reduction of the internal radius of the central hole, without closure thereof and without any significant stretching of the whole preform due to gravity, thanks to the inward pressure and surface tension of the glass.

The Applicant has verified that optical fibers with attenuation at 1383 nm lower than 0.35 dB/km can be currently obtained with the disclosed method. Moreover, a significant reduction of internal defects in the core of the final fiber (e.g. bubble, voids) is obtained.

The present invention thus relates to a process for producing a low-loss (or low-attenuation) optical fiber comprising:
producing a soot core preform by chemical deposition on a substrate;
removing the substrate from the soot core preform, thereby forming a central hole along the soot preform;
drying and consolidating the soot core preform to form a glass core preform; and
stretching the glass core preform;
wherein the step of drying and consolidating comprises reducing the diameter of the central hole and the step of stretching comprises closing the central hole.

Preferably, the step of reducing the diameter of the central hole comprises reducing the pressure inside the central hole and subjecting the glass core preform to a temperature sufficient to soften glass.

The diameter of the central hole at the end of the drying and consolidation step is preferably of between about 0.05 mm and 0.4 mm, more preferably of between about 0.05 mm and 0.2 mm. Advantageously, the diameter of the central hole at the end of the drying and consolidation step is at most 1:10 of an initial diameter of the central hole.

The step of drying and consolidation is preferably performed in a furnace and advantageously includes drying the soot core preform at a first temperature, consolidating the de-hydrated soot core preform at a second temperature higher than the first temperature and subjecting the consolidated core preform to a third temperature higher that the second temperature for reducing said diameter.

In greater detail, the step of drying and consolidation is preferably performed in a furnace including a first zone and a second zone, and comprises in sequence the following steps:
drying the soot core preform in the first zone,
moving the dried soot core preform from the first zone to the second zone,
consolidating the soot core preform in the second zone,
moving the consolidated core preform from the second zone to the first zone,
reducing the pressure in the central hole,
increasing the temperature in the second zone to a temperature sufficient to soften glass,
moving the consolidated core preform from the first zone to the second zone,
keeping the consolidated core preform in the second zone until the diameter of the central hole has reduced to a desired value, and
removing the consolidated core preform from the furnace.

The pressure in the central hole is preferably reduced to at most 200 mBar, more preferably to at most 100 mBar.

For reducing the pressure in the central hole, a low-melting temperature member is fit to a lower end of the central hole glass before the step of drying, and then a vacuum pump extracts gas from the central hole from an upper end thereof after the consolidated core preform has been moved from the second zone to the first zone.

Reducing the diameter of the central hole advantageously comprises subjecting the glass core preform to a temperature between about 1495° C. and 1540° C. This thermal treatment is performed for a predetermined time. In particular, reducing the diameter of the central hole preferably comprises subjecting the glass core preform to a temperature sufficient to soften glass for a time comprised between 1 h and 3 h.

The soot core preform has a core radius and an external radius, the ratio between the core radius and the external radius being preferably lower than about 0.4.

BRIEF DESCRIPTION OF THE DRAWINGS

The invention is described in detail below with reference to the attached figures, in which a non-restrictive example of application is shown. In particular.

DETAILED DESCRIPTION OF THE INVENTION

A process for producing a glass optical fiber according to the present invention includes the following steps.

In a first stage, a plurality of chemical substances, typically comprising oxides of silicon and germanium, is deposited on a cylindrical mandrel (typically of aluminium) by Outside Vapor Deposition (OVD), using a OVD apparatus of a known type (not shown). The substances so deposited will form the core and an inner cladding portion of the final optical fiber. During the soot deposition, the reactants flow may be varied so as to obtain a predetermined Refractive Index Profile (RIP).

In particular, by controlling the reactants flow it is possible to obtain a desired ratio between core radius and external radius of the core preform, and a desired average density of the soot at the end of the deposition stage.

Figure 1:
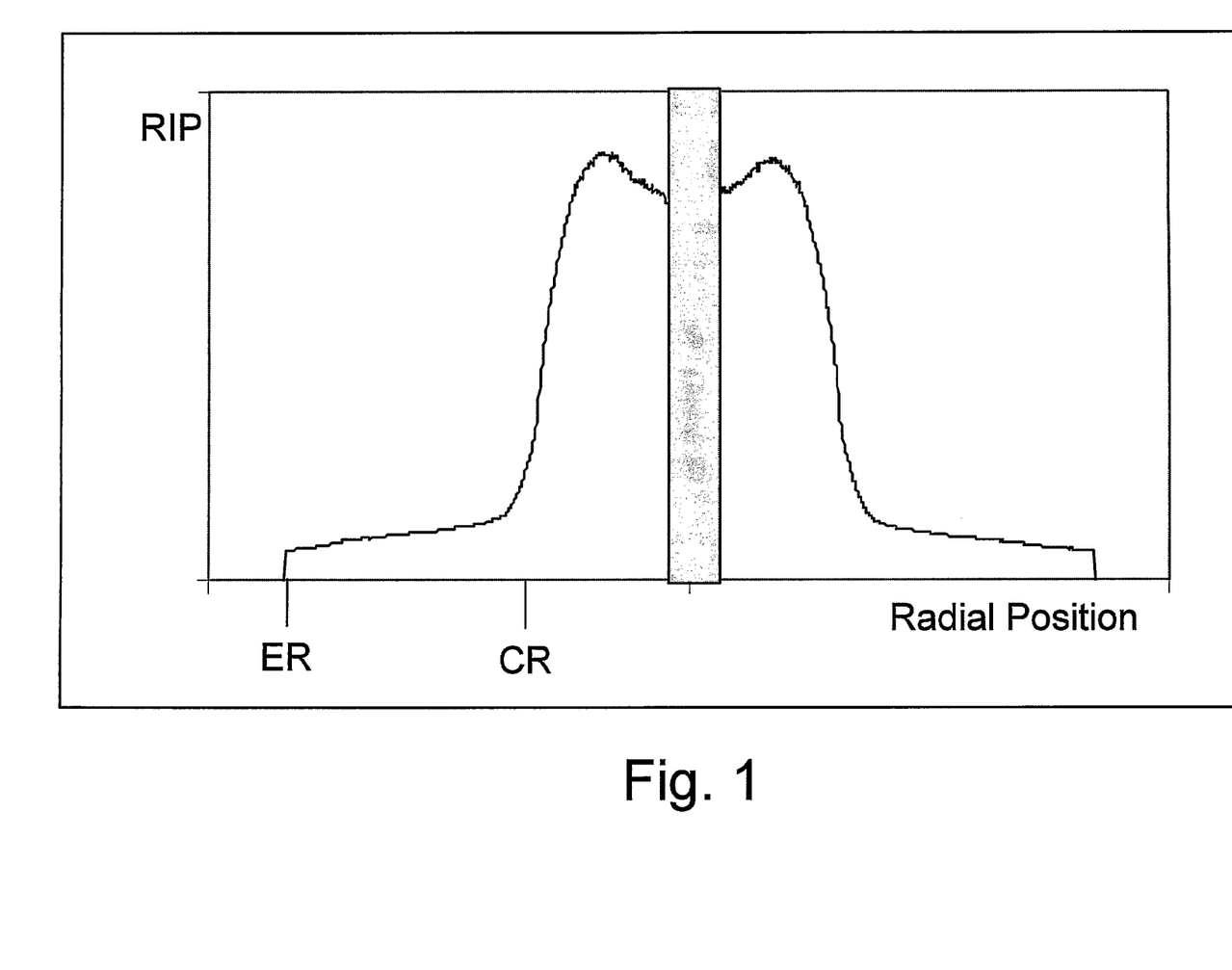
FIG. 1 shows the Refractive Index Profile (RIP) of a core preform obtained at an intermediate stage of the process of the present invention.

The ratio between core radius and external radius can be derived from the Refractive Index Profile (RIP) of the core preform, which in turn can be measured on the core canes (resulting from the fourth stage of the process described below) by means of an appropriate preform profile analyser. FIG. 1 shows the RIP of a core cane realized by the above OVD process, measured by a YORK P106 preform analyser (the zone in grey cannot be detected by the instrument). The RIP has indicated on the horizontal axis the core radius (CR) and the external radius (ER).

The Applicant has verified that the ratio between core radius and external radius should be preferably lower than 0.4, more preferably lower than of 0.38, still more preferably lower than of 0.33, so as to prevent contamination of the core and inner cladding region due to diffusion of OH from the overcladding region.

In a second stage, the mandrel is extracted from the core preform, leaving a central hole along the longitudinal axis of the core preform.

Figure 2:
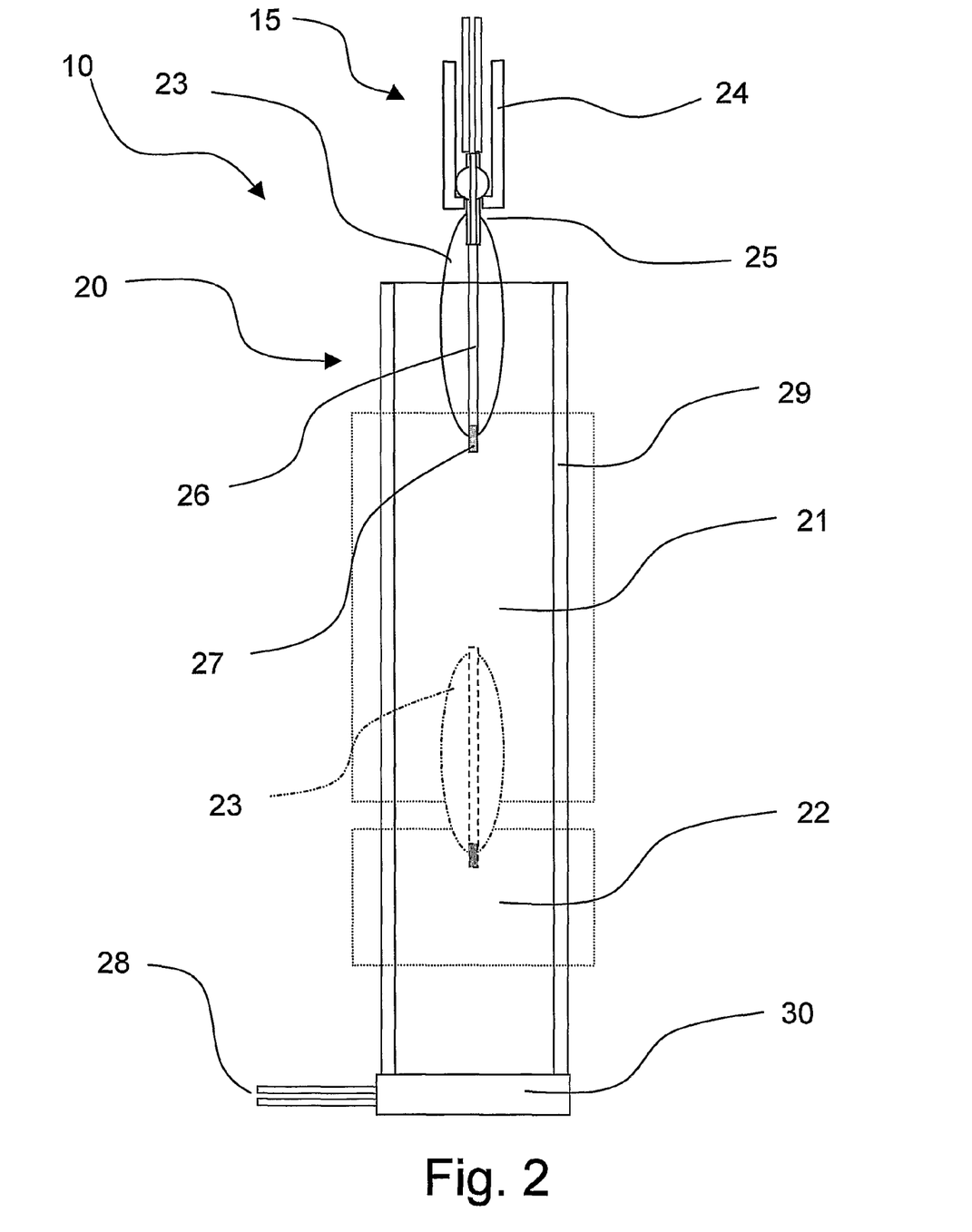
FIG. 2 show (not in scale) a furnace for consolidation of a soot preform.

In a third stage, herein below described with reference to FIG. 2, the core preform 23 is subjected to a process of drying and consolidation by means of an apparatus 10. Drying and consolidation apparatus 10 comprises a furnace 20 and a preform translation device 15.

The furnace 20 comprises a lateral wall 29, preferably cylindrical, a basement 30 and a heating system not shown. Lateral wall 29 internally delimits a region for thermal treatment of the preform, including an upper zone 21 and a lower zone 22. In use, the furnace 20 is heated in such a way as to show a non-uniform longitudinal temperature profile. In particular, the temperature in the lower zone 22 is higher than in the upper zone 21, and the lower zone 21 is therefore called also "hot zone". Advantageously, the upper zone 21 and the lower zone 22 are used for de-hydration and consolidation of the preform 23, respectively.

Basement 30 of furnace 20 may be connected to a gas delivery system (not shown) through one or more ducts 28.

The core preform 23 is provided at one end with a handle 25 and the preform translation device 15 comprises an arm 24 for gripping the handle 25 and holding the preform 23 vertically. The preform translation device 15 is suitable to move the preform vertically between an upper position outside the furnace 20 and a lower position within the hot zone 22 of the furnace 20. A gas flow passage is provided through arm 24 and handle 25 to allow a drying gas to flow from a gas delivery device (not shown) into the central hole 26 of the preform 23.

The process of consolidation and drying will be hereinbelow described with reference to FIG. 3, which shows a typical temperature profile 31 within the furnace 20, represented as temperature (left vertical axis) vs. axial position along the furnace (horizontal axis) measured from the top thereof. It can be observed that the temperature in the upper zone 21 is almost constant (i.e. zone 21 is an almost isothermal zone), then rises quite rapidly through a transition zone 19 to reach its highest value in the hot zone 22.

Figure 3:
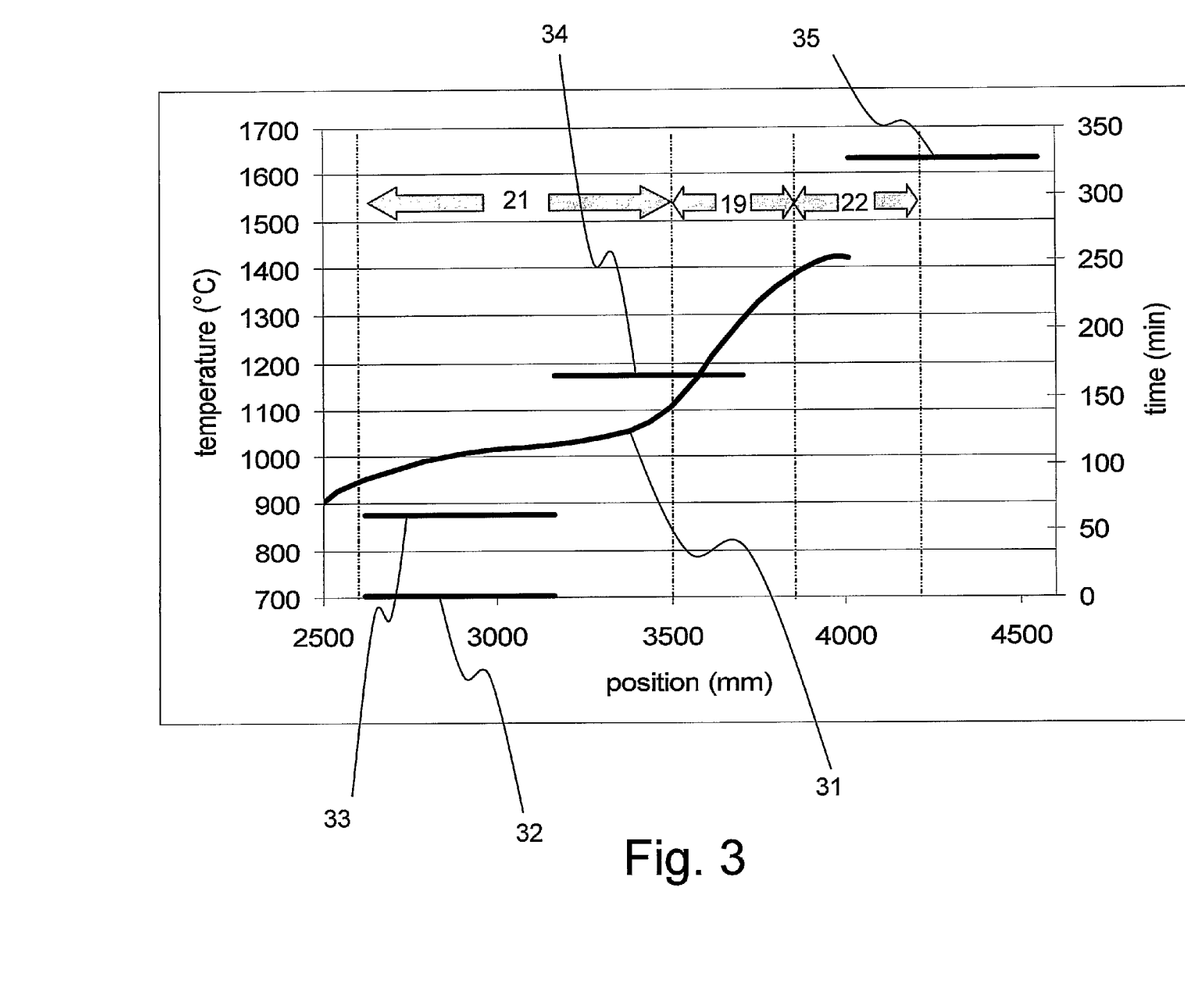
FIG. 3 represents the temperature within the furnace, the position of the preform, and the preform travelling time during the process of drying and consolidation of the core soot preform.

FIG. 3 further shows the position of the preform 23 (represented by a black segment of length proportional to that of the preform) vs. time (right vertical axes) during the dehydration-consolidation process.

The process starts by coupling arm 24 to handle 25 and by placing the preform 23 in the upper position outside the furnace 20. A cylindrical tube 27, made of low-melting temperature glass, is then fitted to the central hole 26 at the bottom of the preform 23.

The preform 23 is then moved down into the upper zone 21 of the furnace 20. One or more drying gases, typically including $Cl_2$, are fed into the central hole 26 through arm 24 and handle 25, in order to eliminate the hydroxide ions and the water molecules in the preform (drying process). For example, 0.15 l/min of $Cl_2$ may be fed together with 1.5 l/min of He. Moreover, an inert gas, preferably He, is fed through ducts 28 into the furnace 20. For example, 80 l/min of He are fed into the furnace 20 at this stage.

In the diagram of FIG. 3, number 32 indicates the position of preform 23 inside the furnace 20 at the beginning of the dehydration process, in which the preform 23 is positioned in the upper zone 21 (in the example here considered, the upper end of the preform is at about 2700 mm from the top of the furnace 20 and the lower end thereof at about 3200 mm from the top of the furnace 20). The temperature of the preform grows in a relatively short time to the temperature of curve 31 corresponding to that position, which is of about 1000° C. (more precisely, from about 950° C. to about 1050° C.) in the illustrated example.

The preform 23 is kept in this position for a predetermined time, such as for example 1 h, to allow complete dehydration thereof. Number 33 indicates the preform 23 at the end of this dehydration process (same position but time-shift of 60 min with respect to segment 32).

Preform 23 is then moved down towards hot zone 22 for the consolidation process, preferably at a constant speed, for example 5 mm/min. Number 34 indicates an intermediate position of the preform 23 during lowering, 160 min from the beginning of the process in the illustrated example. In this intermediate position, the ends of the preform 23 are subjected to very different temperatures, since the temperature of furnace 20 varies sharply in that zone (in the illustrated example, the temperatures at the upper and lower ends of the preform 23 are of about 1030° C. and 1300° C., respectively).

As the lower end of the preform 23 enters the hot zone 22, the preform 23 starts consolidating (i.e. the soot core preform transforms into a vitrified core preform). Meanwhile, the glass tube 27 melts and seals the lower end of the central hole 26. In FIG. 2, the preform 23 is represented by a dashed line while entering the hot zone 22. In this stage, the furnace 20 is still fed with an inert gas, such as He, preferably at the same flow rate as in the drying stage. At this stage, the temperature in the hot zone 22 may be, for example, of about 1420° C.

The preform 23 is moved down until it has almost completely crossed the hot zone 22, more precisely until the lower end thereof has exited the hot zone downward and the upper end has entered the hot zone. In the diagram of FIG. 3, number 35 indicates the position of the preform 23 at completion of the consolidation process, after a predetermined travelling time in zone 22. The vitrified core preform 23 is then moved back out of the hot zone 22.

In a conventional process, preform 23 would be completely removed from furnace 20 and the process of drying and consolidation of the core preform would be concluded. A typical preform would have, at the end of a conventional process of drying and consolidation, a diameter of the central hole of between 3 mm and 4 mm.

According to the present invention, the preform 23 is not extracted from the furnace after drying and consolidation, and is subjected to a further thermal treatment in the furnace 20 for partial closure of the central hole 26, i.e. for reducing the diameter of the central hole 26 without a complete closure thereof.

In greater detail, instead of being extracted from the furnace 20, the preform 23 is raised from the hot zone 21 towards the upper zone 21, such as up to the intermediate position 34 in FIG. 3. A vacuum is then created inside the central hole 26 through the arm 24 and handle 25 by means of a vacuum pump which extract the gas from the central hole, so as to reduce the pressure in the hole 26 down to a value preferably lower than 200 mBar, more preferably lower than 100 mBar. At the same time, the temperature in the hot zone 22 is raised at a value preferably between 1495° C. and 1540° C., more preferably between 1510° C. and 1530° C., for example 1520° C. After stabilization of the temperature in the hot zone 22 (i.e. after about 10 min), the preform 23 is driven down again into the hot zone 22, for example down again to position 35 in FIG. 3, at a speed preferably comprised between 3 mm/min and 4 mm/min, for example of 3.4 mm/min. In this stage, the furnace 20 is still fed with an inert gas, preferably He. The flow rate of this inert gas through ducts 28 is preferably lower than in the drying and consolidation stages. A suitable flow rate is for example 20 l/min.

In the hot zone 22, the glass softens and the central hole 26 undergoes a diameter reduction due to the inward pressure and surface tension of the glass, without any significant stretching of the preform due to gravity. Due to the downward motion, the diameter reduction runs from the lower end to the upper end of the preform. The travelling time of the preform 23 across the hot zone 22 (i.e. the time required for a point on the preform to completely cross the hot zone) is predetermined so as to obtain the desired hole diameter reduction. After reaching position 35, the preform 23 may be kept steady for a predetermined time, for example for 15 min, to compensate for the typically larger initial hole diameter on top of the preform. Then, the preform 23 is raised up and finally removed from the furnace 20.

The diameter of the central hole 26 at the end of this further thermal treatment is preferably lower than about 0.4 mm and greater than about 0.05 mm, more preferably lower than about 0.2 mm and greater than about 0.05 mm. Considering a typical initial diameter of about 4 mm, the final diameter is preferably between about 1:10 and about 1:80 the initial diameter, more preferably between about 1:20 and about 1:80 the initial diameter. A diameter larger than 0.4 mm could result in a not-negligible OH contamination after extraction of the preform 23 from the furnace 20, while a diameter lower than 0.05 mm could induce premature closure of the hole 26.

The final hole diameter reached at the end of the further thermal treatment depends on different parameters, including the initial hole diameter, the temperature in the hot zone 22, the pressures inside the central hole 26 and outside the preform 23, and the time of travelling of the preform 23 in the hot zone 22.

It is possible to simulate the geometrical modification of the preform 23 in the furnace 20 by considering a hollow cylinder of infinite length, having an internal radius $R_1$, an external radius $R_2 \gg R_1$, an internal pressure $P_1$ and an external pressure $P_2$, made with a material having viscosity $\mu$ and surface tension $\sigma$. It can be shown that the internal radius $R_1$ varies in time as follows:

$$R_1(t) = \left(R_1(t=0) + \frac{\sigma}{P_2 - P_1}\right) \mathrm{Exp}\left(-\frac{(P_2 - P_1)t}{\mu}\right) - \frac{\sigma}{P_2 - P_1}$$

A working value of surface tension $\sigma$ for glass is 0.3 N/m. The difference $P_2 - P_1$ is nearly 1 bar. Viscosity data for silica glass are available in literature. At 1500° C., viscosity is of about $1.4 \cdot 10^8$ kg/(m sec).

Figure 4:
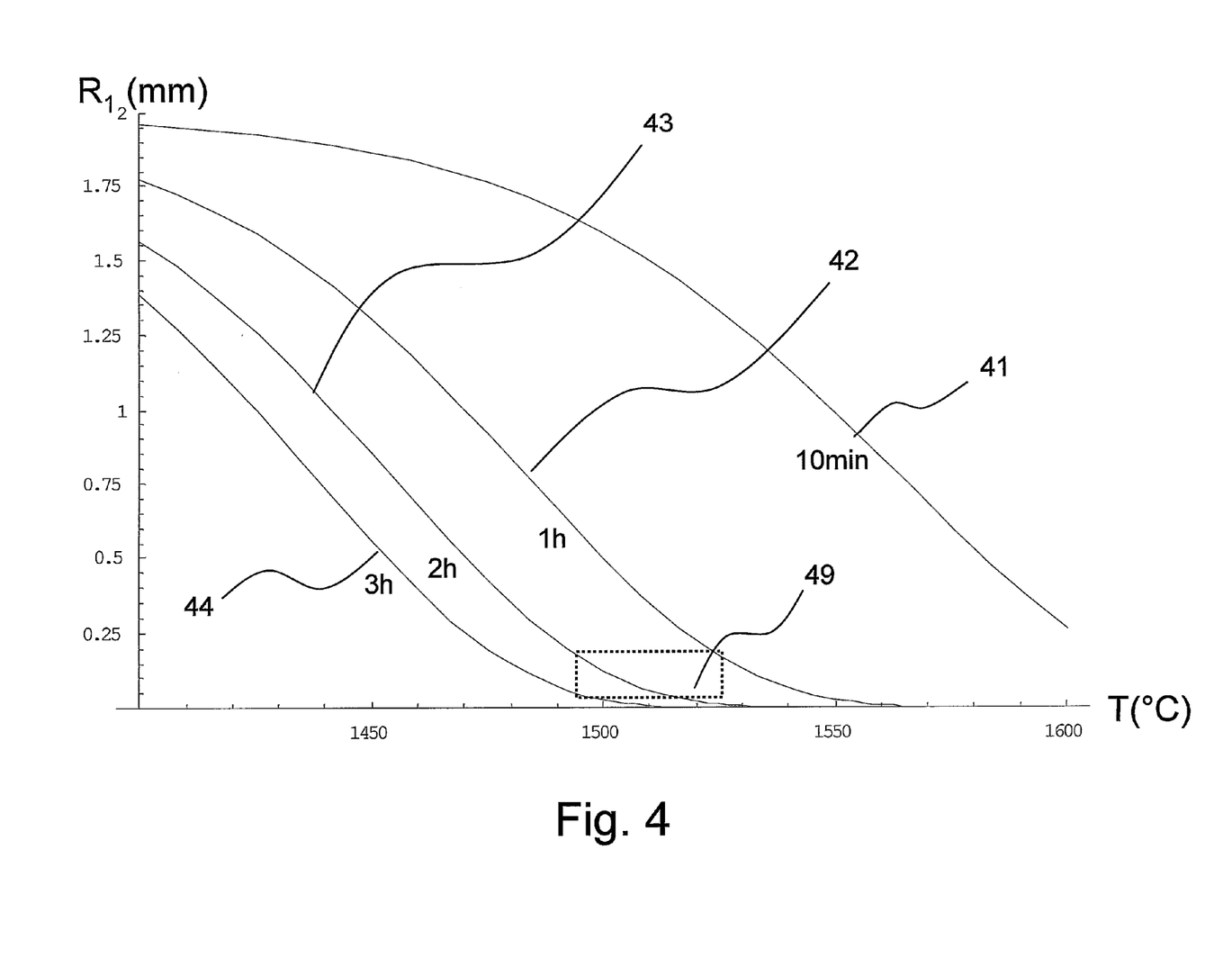
FIG. 4 shows a series of curves simulating the behaviour of the consolidated preform during a heat treatment wherein the diameter of the central hole is reduced.

FIG. 4 shows different curves associated with the evolution of the internal radius $R_1$ vs. temperature T in the hot zone 22, at various travelling times of the preform 23 within the hot zone 22:

curve 41: 10 minutes
curve 42: 1 hour
curve 43: 2 hours
curve 44: 3 hours

A set of curves like those reported in FIG. 4 can be easily obtained empirically for any specific furnace by a person skilled in the art.

Having selected a desired range of values for the final diameter and a suitable range for the temperature T of the hot zone 22, FIG. 4 allows identifying a suitable curve. For example, by choosing a final hole diameter between 0.05 mm and 0.2 mm and a hot zone temperature between 1495° C. and 1525° C., a rectangular box 49 can be drawn in the diagram, and all the curves intersecting this box identify suitable travelling times. In the present case, intersections of box 49 with curves 42 and 44 show that a suitable travelling time is between 1 hour and 3 hours.

The process parameters must be set so as to achieve the desired diameter reduction without the complete closure of the central hole 26, in order to prevent formation of voids, bubbles, or similar defects. The zone of box 49 is also characterized by a reduced slope of the curves, which means a reduced sensitivity to the process conditions (time and temperature).

As any person skilled in the art can realize, different ranges of T could be appropriate with a suitable change of travelling time in the hot zone 22.

Figure 5:
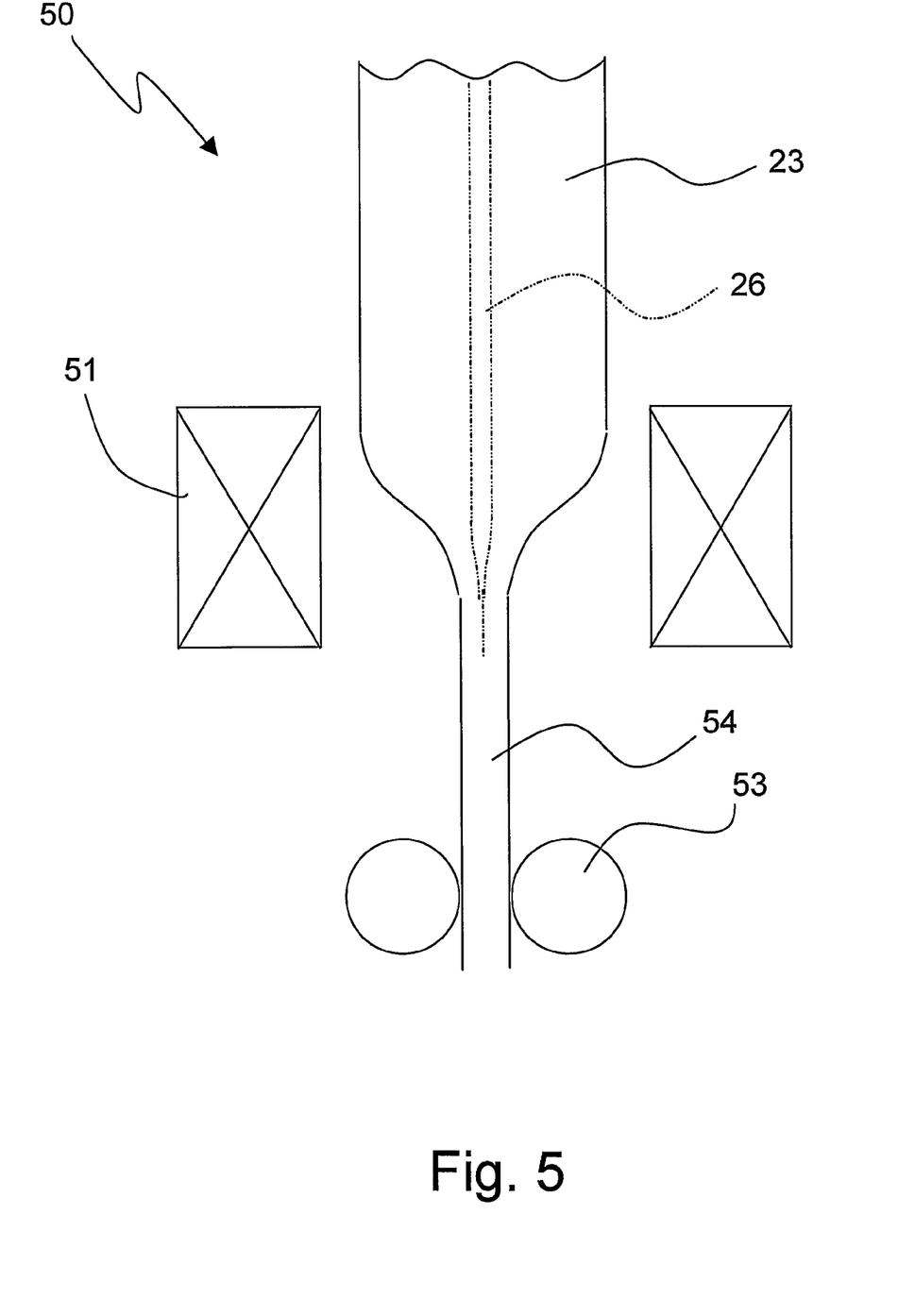
FIG. 5 schematically represents a device for stretching the consolidated core preform.

In a fourth stage, the consolidated core preform 23 is subjected to a stretching process by means of a stretching apparatus shown schematically in FIG. 5 and there indicated with 50.

The stretching apparatus 50 includes a vertical furnace 51, a preform feeding device (not shown) for feeding the preform 23 into the furnace 51 and a traction device 53 for pulling down the cooled material.

The stretching process includes creating vacuum inside the reduced-diameter central hole through the handle of the preform 23 (as described, for example, in U.S. Pat. No. 4,810, 276) and lowering the preform 23 into the vertical furnace 51 for melting a lower end thereof.

Possible process conditions are the following:
vacuum: 1 mBar;
temperature of furnace 51: 1920-1980° C.;
tractor speed: 25 cm/min.

The melt of the lower end of the preform 23 and the vacuum inside the central hole 26 cause the walls of the central hole 26 to collapse to a complete closure. The fused glass material exiting the furnace cools, forming a cylindrical elongated glass member 54 of predetermined diameter, which is stretched downwards by the traction device 53. The traction device may be of the type described in WO 01/49616, which is suitable to impart a twist to the elongated glass member 54 during stretching, thus producing a rod-like member with a high degree of straightness.

After cooling, the elongated glass member 54 is cut in a plurality of rods, called "core rods" or "core canes".

In a fifth stage, each core rod is used as a substrate for a further process of OVD chemical deposition of a known type, herein below called "overcladding process". The overcladding process comprises depositing $SiO_2$ on the core rod, to form an outer portion of the preform that will define an outer portion of the cladding of the final fiber. This further deposition process may be carried out as described in WO 03/045861. The result of this stage is a final preform having the outer surface of the cladding coaxial to the core.

In a sixth stage, herein below identified as "overcladding dehydration-consolidation process" or "final-preform consolidation process", the final preform is dried and consolidated by a procedure similar to that of the third stage, thus obtaining a vitrified final preform. The same apparatus used for the third stage (apparatus 10) can be used for this stage, as well.

In the final-preform consolidation process, $Cl_2$ is fed together with He into the furnace through the bottom piping 28, while the preform 23 is moved down at a predetermined speed. Preferred values for the process parameters are the following:
flow rate of $Cl_2$: between 0.85 l/min and 1.7 l/min;
flow rate of He: between 20 l/min and 30 l/min;
speed of the preform during lowering: between 5 mm/min and 7 mm/min;
temperature of the (isothermal) zone 21: between 1000° C. and 1100° C.;
temperature of the hot zone 22: between 1480° C. and 1530° C.

In a seventh (and last) stage, the final preform is drawn in appropriate drawing towers of a known type, wherein the final preform is supplied, along a vertical direction, to a furnace, so as to obtain melting of a lower portion thereof. The molten material is then drawn and cooled so as to obtain an optical fiber with the desired characteristics.

EXAMPLE

The Applicant has compared the attenuation of four different fibers $F_1$, $F_2$, $F_3$ and $F_4$, differing for the characteristics of the core preform, for the conditions in the core-preform consolidation process and for the conditions in the final-preform consolidation process.

The characteristic of the core preform that has been varied (by varying the flow of the reactants in the deposition process), is the ratio between core radius and external radius.

As previously mentioned, the ratio between core radius and external radius can be derived from the Refractive Index Profile (RIP) of the core preform, which can be measured on the core cane by means of an appropriate preform profile analyser.

A first core preform, which will be referred to as "core preform E", has been produced with a ratio between core radius and external radius of 0.38. A second core preform, which will be referred to as "core preform F", has been produced with a ratio between core radius and external radius of 0.44.

Core preform F is considered to be more subjected to OH contamination from the overcladding than core preform E, since it is easier for the OH ions collected in the overcladding region and still present after drying and consolidation to reach the core region during the high-temperature process of drawing.

The core-preform consolidation process has been first performed in a conventional way, i.e. with no hole diameter reduction, and according to the present invention, i.e. with hole diameter reduction. The conventional process will be referred to as "core-preform consolidation A" the process according to the present invention as "core-preform consolidation B".

The final preform consolidation process has been performed in two different conditions, which will be referred to as "final-preform consolidation C" and "final-preform consolidation D". In final-preform consolidation C, 0.85 l/min of $Cl_2$ in 25 l/min of He have been fed from the bottom piping 28, the preform 23 was moved down at a speed of 7 mm/min, and the isothermal zone 21 and hot zone 22 were at 1000° C. and 1500° C., respectively. In final-preform consolidation D, 1.7 l/min of $Cl_2$ in 25 l/min of He have been fed from the bottom piping 28, the preform 23 was moved down at a speed of 5 mm/min, and the isothermal zone 21 and hot zone 22 were at 1100° C. and 1500° C., respectively.

Fibers $F_1$, $F_2$, $F_3$ and $F_4$ were made as reported in Table I.

TABLE I

|   | Core preform | Core-preform consolidation | Final-preform consolidation |
|---|---|---|---|
| $F_1$ | F | A | C |
| $F_2$ | F | B | C |
| $F_3$ | E | B | C |
| $F_4$ | E | B | D |

Figure 6:
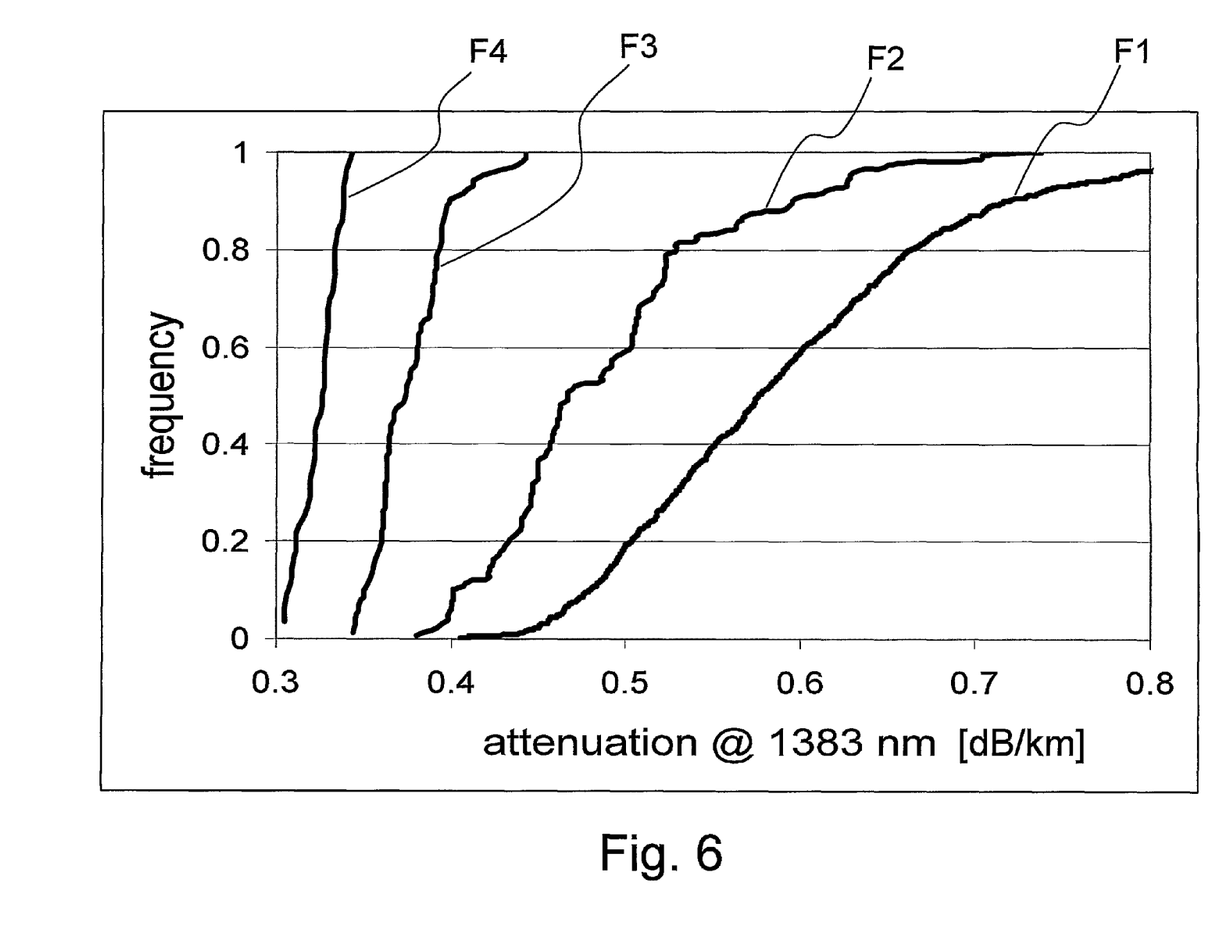
FIG. 6 shows the cumulative distribution (indicated as frequency in the vertical axis) of the attenuation at 1383 nm for four fibers obtained by four different processes.

FIG. 6 shows the cumulative distribution of the peak attenuation at 1383 nm for fibers $F_1$, $F_2$, $F_3$ and $F_4$. The results are summarized in terms of average values in Table II, together with the averages at 1310 nm.

TABLE II

|   | att @ 1383 nm | att @ 1310 nm |
|---|---|---|
| F + A + C | 0.59 | 0.336 |
| F + B + C | 0.49 | 0.332 |
| E + B + C | 0.38 | 0.327 |
| E + B + D | 0.32 | 0.326 |

It can be appreciated that the reduction of the central hole in the core-preform consolidation process (B) allows reducing sensibly the signal attenuation at 1310 nm and 1383 nm, while further improvements are achieved by appropriately choosing the characteristics of the core preform (E better than F) and the conditions in the final-preform consolidation process (D better than C).

Regarding the internal defects of the fiber, as detected in the drawing process, a significant difference can be observed between preforms obtained from processes A and B, regardless the preform RIP and the final-preform consolidation process. In particular, the number of defects detected in the preforms from process B is less than half those found in the preforms from process A.

The invention claimed is:

1. A process for producing a glass core preform for a low-attenuation optical fiber, the process comprising:
producing a soot core preform by chemical deposition on a substrate;
removing the substrate from the soot core preform, thereby forming a central hole along the soot preform;
drying and consolidating the soot core preform in a furnace to form said glass core preform; and
stretching the glass core preform;
wherein the step of drying and consolidating comprises reducing the diameter of the central hole without extracting the glass core preform from the furnace,
wherein the step of stretching comprises closing the central hole,
wherein the diameter of the central hole at the end of the drying and consolidating step is about 0.05 mm to about 0.40 mm.

2. The process according to claim 1, wherein the step of reducing the diameter of the central hole comprises reducing the pressure inside the central hole and subjecting the glass core preform to a temperature sufficient to soften glass.

3. The process according to claim 2, wherein said pressure is reduced to at most 200 mBar.

4. The process according to claim 3, wherein said pressure is reduced to at most 100 mBar.

5. The process according to claim 1, wherein the diameter of the central hole at the end of the drying and consolidating step is about 0.05 mm to about 0.2 mm.

6. The process according to claim 1, wherein the diameter of the central hole at the end of the drying and consolidating step is at most 1:10 of an initial diameter of the central hole.

7. The process according to claim 1, wherein the step of drying and consolidating includes drying the soot core preform at a first temperature, consolidating the de-hydrated soot core preform at a second temperature higher than the first temperature and subjecting the consolidated core preform to a third temperature higher than the second temperature for reducing said diameter.

8. The process according to claim 1, wherein the step of drying and consolidating comprises the following sequence of steps:
drying the soot core preform in a first zone of said furnace;
moving the dried soot core preform from the first zone of said furnace to a second zone of said furnace;
consolidating the soot core preform in the second zone to form a consolidated core preform;
moving the consolidated core preform from the second zone to the first zone;
reducing the pressure in the central hole;
increasing the temperature in the second zone to a temperature sufficient to soften glass;
moving the consolidated core preform from the first zone to the second zone;
keeping the consolidated core preform in the second zone until the diameter of the central hole has reduced to a desired value; and
removing the consolidated core preform from the furnace.

9. The process according to claim 8, wherein said pressure is reduced to at most 200 mBar.

10. The process according to claim 9, wherein said pressure is reduced to at most 100 mBar.

11. The process according to claim 8, further comprising fitting a low-melting temperature member to a lower end of the central hole before the step of drying, and wherein reducing the pressure in the central hole comprises extracting gas from the central hole from an upper end thereof.

12. The process according to claim 1, wherein reducing the diameter of the central hole comprises subjecting the glass core preform to a temperature of about 1495° C. to about 1540° C.

13. The process according to claim 1, wherein reducing the diameter of the central hole comprises subjecting the glass core preform to a temperature sufficient to soften glass for 1 hour to 3 hours.

14. The process according to claim 1, wherein the soot core preform has a core radius and an external radius, the ratio between the core radius and the external radius being lower than 0.4.

* * * * *